May 12, 1942.  W. M. HAHNEMANN ET AL  2,283,058
SUPERVISORY MEANS FOR HIGH FREQUENCY RADIATIONS
Filed April 6, 1940
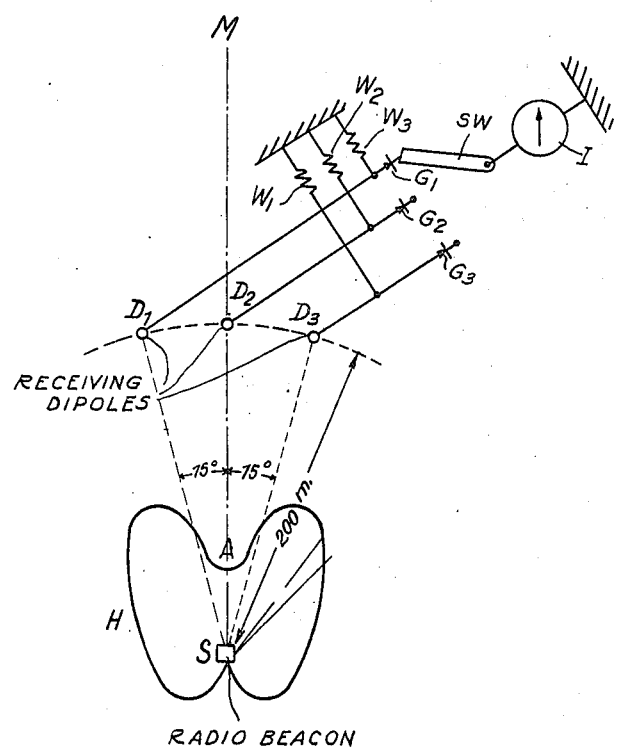
*Inventors:*
Walter Max Hahnemann
Ernst Kramar
by R C Hopgood
*Att'y*

Patented May 12, 1942

2,283,058

UNITED STATES PATENT OFFICE 2,283,058

SUPERVISORY MEANS FOR HIGH FREQUENCY RADIATIONS

Walter Max Hahnemann and Ernst Kramar, Berlin, Germany, assignors to C. Lorenz Aktiengesellschaft, Berlin-Tempelhof, Germany, a company Application April 6, 1940, Serial No. 328,244
In Germany April 26, 1939

1 Claim. (Cl. 250—11)

This invention is concerned with the problem of supervising the shape and, if desired, also the intensity of radiation patterns of the kind emitted by radio beacons, for instance. This problem exists especially with such radiation patterns as are irregular in shape. For example, the radiation pattern may have indents, as is the case with glide path landing methods of the type described in our copending application Serial No. 244,440, filed December 7, 1938, Patent No. 2,241,907, granted May 13, 1941. For simplicity the invention described hereafter is explained with the aid of this special case. It is to be understood, however, that the invention is not only applicable in connection with such landing methods.

In the case of the said glide path landing method a spatial radiation pattern is produced which has an indent in the direction of landing and which by such indent is so interrelated with a guide plane for aircraft that straight energy lines of the same field intensity are produced, these being the desired glide paths located in the guide plane.

In order now to prevent accidents the spatial radiation pattern should be supervised, this being particularly necessary as regards certain angles thereof.

According to the invention which is concerned with such supervision receiving antennae are arranged in the field of radiation. From these antennae energy is alternately supplied to a supervisory instrument after rectification. This instrument is so constructed that the movable indicating means thereof, such as a pointer, will be at rest whenever the radiation pattern to be supervised is in order. To such end energy taken from different points of supervision is made by suitable means, such as resistances, to be of the same intensity when acting on the supervisory instrument.

The accompanying drawing shows a diagrammatic plan view referred to in explaining the invention.

H is the horizontal diagram of a radiation pattern the spreading curve of which is to be supervised. This diagram has an indent A. M designates the center line of diagram H. S is its center of radiation constituted by a suitable radio beacon. The shape of the diagram has to be supervised within a space that comprises angles of 15° on each side of the line M. The remaining part of the diagram is not of interest here.

According to the invention the embodiment thereof here represented by way of example has three vertical dipoles $D_1$, $D_2$, $D_3$ arranged in the radiation field. $D_2$ is located in the center line M while $D_1$, $D_3$ are spaced from $D_2$ by distances determined by the said angles of 15°. These three dipoles are equi-distant from the center of radiation S, thus being located in circular relation to each other. The energy received by the dipoles is conveyed over rectifiers $G_1$, $G_2$, $G_3$ to a switch $sw$ that acts to connect the dipoles to a supervisory instrument one after the other and each for a short time. Such instrument $i$, may comprise a rectifier and a continuous current instrument connected in series therewith. The said switch $sw$ is preferably of the rotary type, being driven by a suitable motor. On account of the shape peculiar to the radiation diagram dipole $D_2$ receives less energy than $D_1$ or $D_3$. This would cause the hand or pointer of the supervisory instrument to swing continuously between two indicating positions. The instrument would therefore be difficult to read. In order to avoid this drawback shunt connections $W_1$, $W_2$, $W_3$ may be arranged to equalize the indication so that the supervisory instrument shall always indicate the same value as long as the radiation diagram is in order, except for small fluctuations attributable to the switching operation. Any change in the radiation diagram will then deflect the pointer of the instrument.

Alternatively, the dipoles may be made to receive each the same amount of energy. In order to achieve this the dipoles instead of being arranged in circular relation to each other may be located at different distances from the center of radiation S in accordance with the different energy conditions. Thus, in the example here shown the dipole $D_2$ should be nearer to S than the dipoles $D_1$, $D_3$.

The energy supplied to the supervisory instrument may be equalized also by employing dipoles of different receptivity. For instance, dipole $D_2$ may be larger than the dipoles $D_1$, $D_3$. Preferably, however, the said shunt connections sholuld be provided, this arrangement being simpler than the others because it enables the requisite adjustments to be obtained by varying resistances.

What is claimed is:

An arrangement for supervising radiation diagrams which comprises means to produce a radiation pattern having different energy levels in different directions, receiving antennae located in the field of this radiation pattern at fixed positions at different energy levels, means to rectify energy derived from these antennae, a supervisory instrument alternately connected to such rectifying means, conductors for connecting said antennae to said rectifying means and shunt connections for equalizing the energy derived from said antennae connected to said conductors.

WALTER MAX HAHNEMANN.
ERNST KRAMAR.